United States Patent [19]

Noble

[11] Patent Number: 4,491,274
[45] Date of Patent: Jan. 1, 1985

[54] LAND IRRIGATION APPARATUS PROVIDING IMPROVED WATER DISTRIBUTION

[75] Inventor: Allen T. Noble, Boise, Id.

[73] Assignee: Noble Linear Irrigation, Inc., Boise, Id.

[21] Appl. No.: 323,744

[22] Filed: Nov. 23, 1981

Related U.S. Application Data

[63] Continuation of Ser. No. 147,351, May 7, 1980, abandoned.

[51] Int. Cl.³ .............................................. B05B 3/18
[52] U.S. Cl. .................................. 239/183; 239/711; 239/DIG. 1
[58] Field of Search .............................. 239/177–192, 239/709–721, 163, DIG. 1, 553, 556, 557, 1

[56] References Cited

U.S. PATENT DOCUMENTS

| | | | |
|---|---|---|---|
| 1,197,534 | 9/1916 | Norton | 239/178 |
| 2,988,287 | 6/1961 | Sherman | 239/177 |
| 3,211,381 | 10/1965 | Rasmussen | 239/172 |
| 3,587,763 | 6/1971 | Kinkead | 239/184 |
| 3,822,040 | 7/1974 | Hibbard | 239/553 |
| 4,274,584 | 6/1981 | Noble | 239/183 |

Primary Examiner—John J. Love
Assistant Examiner—Michael J. Forman
Attorney, Agent, or Firm—Shanley, O'Neil and Baker

[57] ABSTRACT

A land irrigation system having an elongated support boom including a water distribution pipe supported above and moved laterally over the area to be irrigated, and a plurality of elongated conduits are supported for movement with and are connected to the water distribution pipe in generally parallel, equally spaced relation to one another and generally transverse to the water distribution pipe. A plurality of sprinkler heads are connected to each elongated conduit in spaced relation to one another with the spray heads on the plurality of elongated conduits cooperating to apply a water spray to a strip of land extending along the water distribution pipe and having a width greater than the length of the elongated conduits. The conduits are mounted generally horizontally with their axes extending at an acute angle relative to the vertical center plane of the water distribution pipe so that no two spray heads connected to any conduit traverse the same path over the land and so that the area covered by the water spray from at least one spray head on each conduit overlaps at least a portion of the area covered by at least one spray head on each adjacent conduit.

18 Claims, 6 Drawing Figures

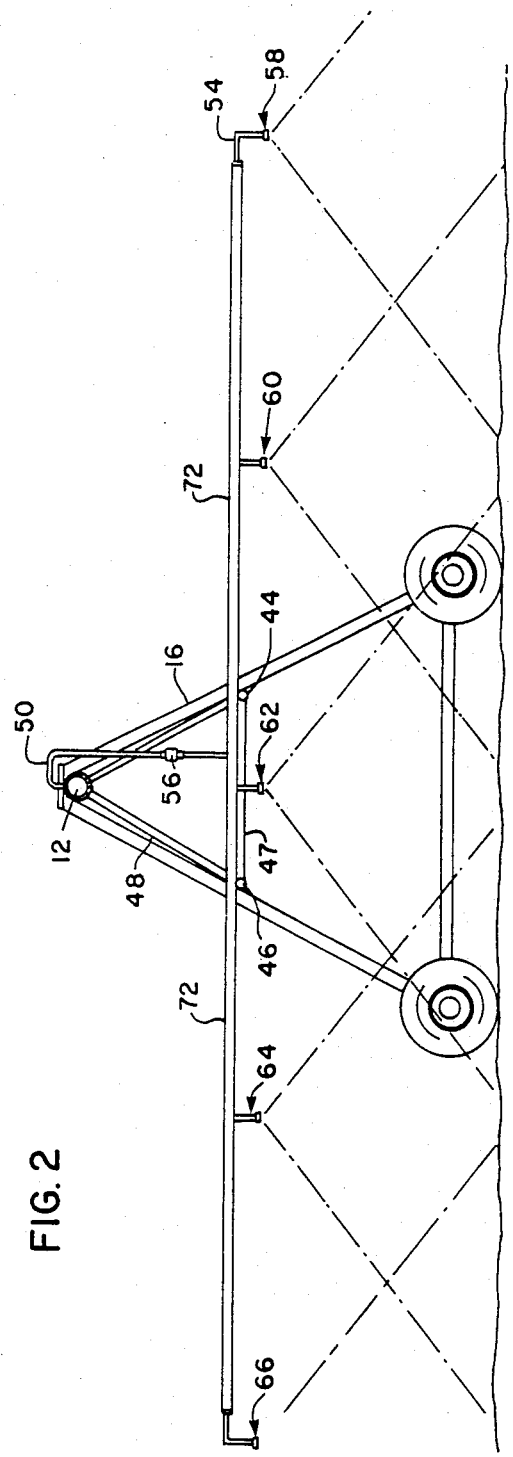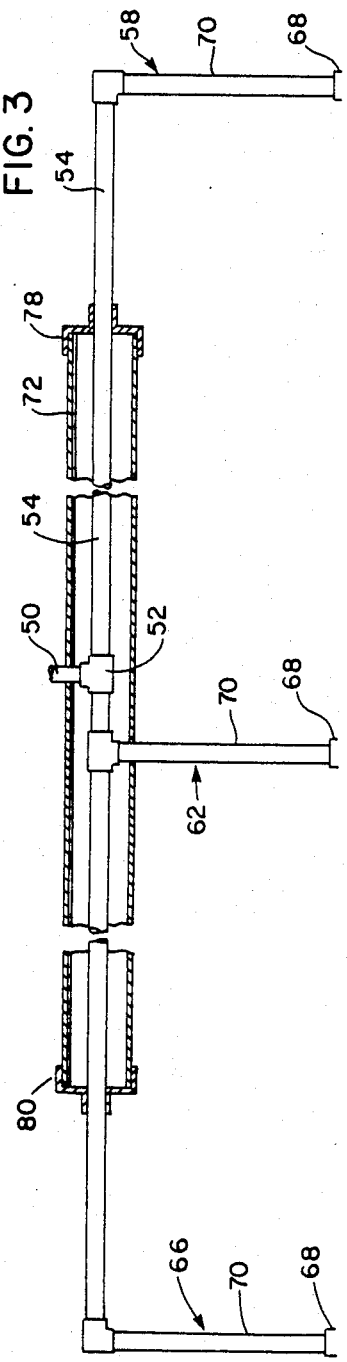

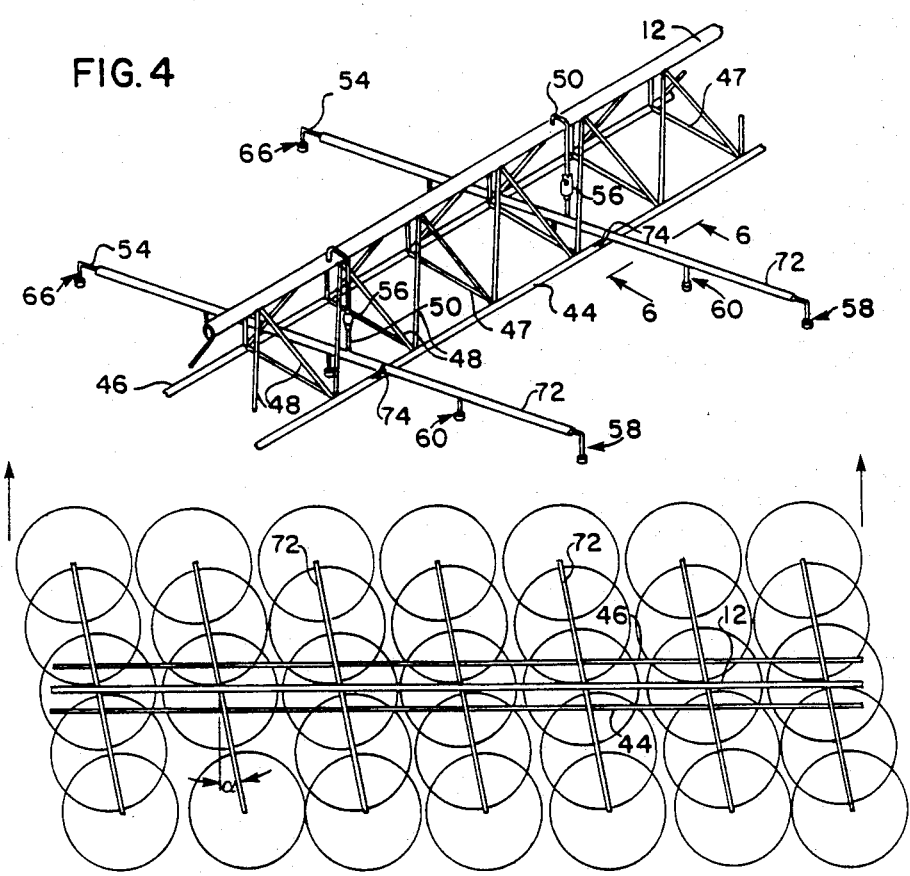
FIG. 4
FIG. 5
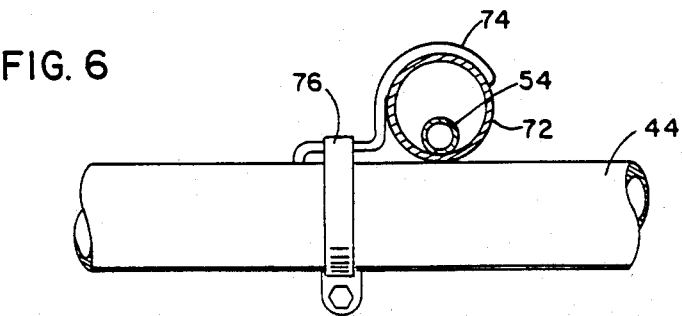
FIG. 6

LAND IRRIGATION APPARATUS PROVIDING IMPROVED WATER DISTRIBUTION

This is a continuation of application Ser. No. 147,351, filed May 7, 1980, now abandoned, the entire disclosure of which in incorporated herein by reference.

BACKGROUND OF THE INVENTION

1. Field of the Invention

This invention relates to land irrigation apparatus of the type employed in the agricultural industry to irrigate large areas of land, and more particularly to an improved water distribution system for use in connection with such apparatus in which water is discharged from spray heads connected to a water distribution pipe as the pipe is progressively moved above the area to be irrigated.

2. Description of the Prior Art

It has long been known to irrigate large areas of land by supporting an elongated water distribution pipe on a boom for movement over the land at a level above the top of vegetation growing on the land and to discharge water from the pipe through sprinkler heads spaced along its length to continuously apply water as the boom is progressively moved over the area to be irrigated. Water has been supplied to these water distribution pipes by various means including both pressurized water mains and movable pumps which supply water from open ditches or the like. The water distribution pipe may have one end pivotally connected to a fixed water hydrant or standpipe, and moved in a circular path about this pivot point or, alternatively, the elongated boom may be moved along a path perpendicular to its longitudinal axis, with water being supplied to the distribution pipe from a water main extending parallel to the path of movement and having hydrants at spaced intervals along its length.

In land irrigation systems of this general type, the sprinkler heads are conventionally located on the top of the water distribution pipe with the water spray from each sprinkler head being directed upwardly and outwardly to cover a generally circular pattern. The spacing of the sprinkler heads is normally substantially equal to or slightly greater than the diameter of the spray pattern anticipated, taking into consideration the spray head configuration, water pressure and the like. The water boom is then moved at a rate such that the desired amount of water is applied to the land during movement of the sprinkler heads thereover.

While the known circle and lateral movement irrigation systems are a substantial improvement over the earlier, solid set systems or manually movable systems, they have not been entirely satisfactory for all soil and climate conditions. Also, it has generally not been possible to obtain an entirely uniform distribution of water over the area due to the inherent unequal distribution resulting from the series of in-line circular pattern of water from the spray nozzles. Further, the maximum time during which water is applied to an area by such apparatus is the length of time required for the boom to traverse a distance substantially equal to the diameter of the respective circular spray patterns. Accordingly, it is sometimes necessary to either apply the water at an excessive rate which can result in crop damage due to the number and size of the droplets in the spray pattern and which can result in substantial running of water on the ground. Alternatively, the spray boom has to be moved at a very slow rate in order to avoid such water damage.

Various attempts have been made to overcome the problems in obtaining a uniform water distribution while maintaining an acceptable rate of movement of the irrigation apparatus. For example, the spacing of sprinkler heads along the water boom has been reduced so that the water spray from adjacent spray heads will fall in overlapping patterns. While this produces an improved uniformity of distribution, the water is still applied to an area along the boom having a maximum width equal to the radius of the spray pattern from an individual nozzle so that the rate of application of water is sometimes excessive.

In order to enable the water boom to be moved at an increased rate, attempts have been made to apply the water to an area extending out further from each side of the boom by providing forwardly and rearwardly extending lateral pipe sections at each water pipe outlet and mounting a sprinkler head at the distal end of each pipe section. A further modification of this arrangement has been to employ a third sprinkler head at the water pipe outlet thereby enabling the sprinkler heads on the ends of the lateral pipe sections to be spaced further apart and thereby apply water to an even greater area. In all of these arrangements known to applicant, the spray heads at each outlet from the boom were arranged in a line perpendicular to the vertical plane of the water pipe so that each of the spray heads at each outlet traversed the same area. As a result, although boom travel could be increased, no improvement was achieved in uniformity of water distribution. Also, difficulty was encountered in these devices in that rigid, heavy pipe was employed to support the additional water nozzles in cantilevered relation from the water distribution pipe and the weight of such pipe and spray heads, combined with the weight of the water in the pipe resulted in frequent failures and crop damage.

SUMMARY OF THE INVENTION

It is the primary object of the present invention to provide an improved water distribution system for use on land irrigation systems of the type described and which enables a more uniform distribution of the water over the area to be irrigated.

Another object is to provide such an improved water distribution system which enables an increased travel rate for the irrigation apparatus or alternatively enables the application of water at a slower rate through use of sprinkler heads having a lower discharge rate and which produce a finer spray which is less likely to damage the crop being irrigated.

Another object of the invention is to provide an improved water distribution system for land irrigation apparatus which applies water more uniformly over an elongated strip of land of increased width and which avoids the defects of the prior art systems.

Another object of the invention is to provide an improved means for supporting and supplying water to a plurality of individual spray heads at each water outlet along the length of the water distribution pipe.

In the attainment of the foregoing and other objects and advantages, an important feature of the present invention resides in providing a plurality of elongated generally horizontal water conduits mounted along the length of the boom in fixed, generally parallel spaced relation to one another and extending generally traversely of the water distribution pipe. A plurality of spray heads are mounted on each elongated water conduit in fixed spaced relation to one another, and coupling means is provided to supply water from the water distribution pipe to the individual elongated water conduits. The water conduits are relatively lightweight and of such small diameter as to be incapable of reliably supporting themselves, when filled with water, in cantilevered relation from their central portion at the boom to the outward projecting ends, and support means mounted on the water boom is provided to support the individual water conduits throughout a major portion of their length. The individual water conduits have their longitudinal axis extending at an acute angle to the vertical center plane of the water distribution pipe so that, as the water boom moves over an area to be irrigated, the spray heads on each conduit are offset from one another along their path of travel. The angle of the conduits relative to the water distribution pipe is such that the spray pattern from the spray heads of each conduit on one side of the water distribution pipe overlaps at least a portion of the area covered by the spray pattern of the spray heads on an adjacent conduit on the other side of the water distribution pipe.

In a preferred embodiment of the invention, the individual transversely extending water conduits are formed from relatively lightweight synthetic resin pipe, for example a one inch PVC (plastic) pipe. The plastic pipe is supported in a length of three inch aluminum tubing which, in turn, is rigidly mounted on the water boom support truss structure. The end portions of the plastic pipe project outwardly past the end of the aluminum tubing and a water spray head is mounted on each cantilevered end of the plastic pipe. Preferably, five spray heads are connected to each conduit in equally spaced relation along its length so that the water boom can be moved at a relatively high rate while at the same time applying water at a relatively slow rate and in a relatively fine spray from each spray head to avoid crop damage and to permit adequate penetration without excessive runoff. An almost completely uniform water distribution can be achieved with this arrangement.

BRIEF DESCRIPTION OF THE DRAWINGS

The foregoing and other objects and advantages of the invention will be apparent from the detailed description contained hereinbelow, taken in conjunction with the drawings, in which:

FIG. 2 is a sectional view taken on line 2—2 of FIG. 1;

FIG. 3 is an enlarged, fragmentary sectional view of a portion of the structure shown in FIG. 2;

FIG. 4 is a fragmentary isometric view of a portion of the irrigation system shown in FIG. 1;

FIG. 5 is a schematic illustration showing the uniform water distribution pattern obtained by the water distribution system of the present invention; and FIG. 6 is a fragmentary sectional view, on an enlarged scale, taken on line 6—6 of FIG. 4.

DESCRIPTION OF THE PREFERRED EMBODIMENTS

Figure 1:
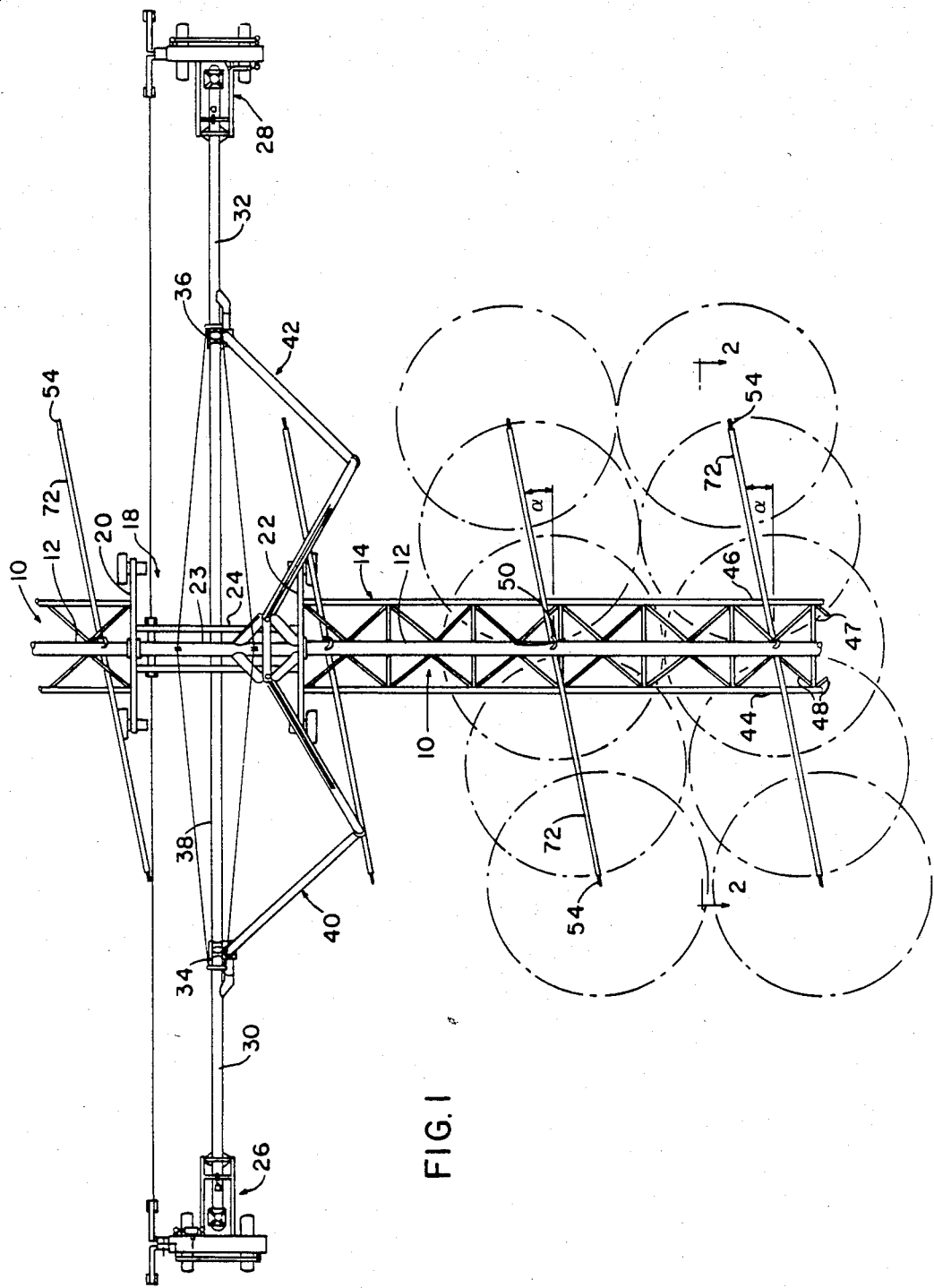
FIG. 1 is a fragmentary top plan view of a land irrigation apparatus embodying the present invention.

Referring now to the drawings in detail, the present invention is shown as being embodied in a lateral move type land irrigation system adapted to be moved progressively along the length of a water main (not shown) and to be successively connected to and disconnected from hydrants in the main to maintain water pressure to the apparatus. A lateral move land irrigation system of this type is disclosed and described in detail in my copending application Ser. No. 80,060 filed Sept. 28, 1979, now U.S. Pat. No. 4,274,584, reference to which may be had for a better understanding of the apparatus and the disclosure of which is incorporated herein by reference.

Briefly, the irrigation apparatus includes a pair of water sprinkler lines, or booms designated generally by the reference numeral 10 and each including a water distribution pipe 12 supported by a truss structure 14 extending between laterally spaced A-frame supports 16 having driven wheels thereon. One end of each boom is mounted at the top of a driven, wheeled conveyance mechanism, or tractor 18, with the respective booms 10 extending outwardly in opposite directions in substantially straight line continuation of one another from the tractor. The apparatus may also be operated with only one spray boom 10. The tractor 18 has an open frame structure including a pair of laterally spaced A-frame assemblies 20, 22 rigidly joined at their top by an elongated water manifold assembly 23 and at a point spaced below the manifold by a structural platform 24, the manifold and platform cooperating to define, in effect, a continuation of the truss structure 14 to provide rigidity and support for the A-frame members of the tractor. The individual booms 10 are made up of a plurality of elongated sections each extending between adjacent pair of wheeled supports 16, with the water distribution pipes of adjacent sections being joined together for limited flexing movement at the respective wheel supports, and with the sections of pipe 12 forming the top structural element or chord of each truss. Typically, enough boom sections are joined together to provide a one-quarter mile boom at each side of the tractor.

Water under pressure is supplied from the water main, not shown, to the connector assemblies 26, 28 each of which includes means for automatically coupling to and uncoupling from hydrants spaced along the main. Coupling assemblies 26, 28 include elongated pipes 30, 32, respectively, having one end supported by trolleys 34, 36, respectively, for movement along an elongated track 38 supported on the tractor 16. A first articulated pipe assembly 40 has one end connected to the manifold 23 and its other end connected to the pipe 30 adjacent the trolley 34, and a second articulated pipe assembly 42 has one end connected to the manifold 23 and its other end connected to the pipe 32 adjacent the trolley 36. By sequentially connecting the connector assemblies 26, 28 to hydrants, water pressure is maintained continuously through the manifold to the water distribution pipes connected to the manifold at each side of the tractor. Suitable control means are provided for controlling the operation of the connector assemblies and for guiding the apparatus along a path parallel to the water main and substantially perpendicular to the axis of the water booms 10.

As best seen in FIGS. 1 and 5, the water booms 10 are illustrated as incorporating a modified Warren truss support structure in which the length of water distribution pipe 12 extending between adjacent wheeled A-frame supports constitutes the top chord of two Warren trusses which are inclined downwardly and outwardly one on each side of the pipe 12. The bottom chords 44, 46 of the trusses are retained in spaced parallel relation by a plurality of cross braces 47, and diagonals 48 extend between the respective bottom chords 44, 46 and the pipe section 12. The position of the bottom chords 44, 46 and the pipe section 12 are such that, in end elevation the cross braces 47 and diagonals 48 define a substantially equilateral triangle so that the structure is capable of withstanding substantial horizontal as well as vertical bending loads.

The support structure in which the water distribution pipe forms a part of an open truss is conventional and is widely used both in lateral move and circle irrigation systems. Other truss structures are also known and may be used in the present invention although the modified Warren truss structure is particularly well adapted for the invention in that it provides convenient means for mounting the improved water distribution means of the invention.

A plurality of outlet openings are formed in the top of the water distribution pipe 12, and a connecting pipe or hose 50 is connected in each outlet. Each connecting pipe 50 extends from the top of pipe 12 outwardly and downwardly and has its lower end connected, through a "T" 52 (see FIG. 3) to the central portion of an elongated horizontal conduit 54. A suitable filter, or strainer 56 is preferably connected in each connector pipe 50.

Each elongated horizontally extending conduit 54 has five substantially identical spray heads 58, 60, 62, 64 and 66 mounted thereon at equally spaced intervals along its length. Each spray head includes a spray nozzle 68 and a short length of conduit 70 which is connected to and projects downwardly from the associated horizontal conduit 54.

The respective elongated horizontal conduits 54 extend throughout a major portion of their length, within a larger pipe 72 which, in turn, extends over and is supported on the top of the chords 44, 46 of the truss structure 14. Suitable means such as a rigid conduit clamp 74 and a flexible strap or hose clamp 76 is provided to fixedly position the support pipe 72 on the support structure. The support pipe 72 has its opposed ends closed by reducers 78, 80, respectively, each having a central opening therein to receive and retain the projecting end portions of the elongated horizontal conduit 54 supported in the pipe. Also, three openings are formed in the bottom of the support pipe 72 in position to receive the short conduit sections 70 of the spray heads 60, 62 and 64.

In order to maintain the weight of the horizontal conduit and the support pipe assembly at a minimum, it is preferred that the horizontal conduits 54 be lightweight synthetic resin pipe. Also, the support pipe 72 is preferably formed from a material having a high strength to weight ratio such as aluminum so that a relatively large diameter pipe may be employed without substantially increasing the overall weight of the structure. In one irrigation system constructed in accordance to the invention, the downwardly extending connecting pipes 52, and the elongated horizontal conduits 54 are one inch synthetic resin pipe of the type which is commercially available and conventionally used in plumbing. The horizontal conduits 54 have a total length of 42 feet, with the spray heads 58–66 being spaced 10½ feet from one another along each conduit 54. In the same apparatus, the support pipe 72 is a three inch aluminum pipe approximately 36 feet long so that the ends of conduit 54 project outwardly approximately three feet past the ends of the aluminum support pipe. The individual spray nozzles 68 are designed to provide a circular spray pattern having a radius of approximately 10 feet so that the spray pattern adjacent spray heads connected to each conduit 54 will overlap.

As best seen in FIGS. 1 and 5, the support pipes 72 and the elongated conduits 54 are mounted on the booms 10 in substantially parallel relation with their axes extending at an acute angle relative to the vertical center plane of the water pipe 12. The spacing between adjacent horizontal conduits, measured along the length of the pipe 12, is substantially equal to the diameter of the spray pattern from an individual spray nozzle, or in the apparatus described above, approximately 20 feet. In that apparatus, the elongated conduits 54 are positioned such that the angle $\alpha$ measured between the axis of the pipe and a line extending perpendicular to the vertical center plane of pipe 12 is approximately 22°. This angle assures a substantial overlap of the spray pattern discharged by the spray nozzles on the respective elongated conduits as well as those on adjacent horizontal conduits as the irrigation apparatus is moved over the area to be irrigated.

While dimensions and structure of a specific apparatus have been employed to describe the invention, it should be apparent that various consideration may influence the configuration of a specific embodiment. It is important, however, that the length of the horizontal conduits be sufficient to enable the discharge of water over a substantial area in order that the spray discharged from any nozzle can be in sufficiently fine droplets and at a sufficiently low flow rate from each nozzle to avoid damage to a growing crop while, at the same time, permitting movement of the apparatus over an area to be irrigated at an acceptable rate. Similarly, it is important that the angle $\alpha$ of the respective elongated conduits be such as to enable the spray patterns from the spray heads on adjacent elongated conduits to overlap sufficiently to assure a substantially uniform water distribution as the apparatus progresses over the area. Thus, while the use of five nozzles per conduit, with the angle $\alpha$ of approximately 22° and a conduit length of approximately 42 feet is preferred for a lateral move irrigation apparatus used in an area where water penetration into the soil is relatively slow, other combinations of the angle and length of the horizontal conduit may be preferable for other soil and/or climate conditions. It is preferred, however, that at least four spray heads be connected to each elongated conduit with two spray heads being disposed on each side of the water distribution pipes. Also, when the water distribution apparatus of the present invention is employed on an irrigation apparatus in which the water spray boom moves in a circular path about a central pivot, the angle $\alpha$ of the respective elongated conduits may be different in order to obtain the desired water distribution and this angle may vary with the distance from the central pivot point.

The use of a relatively lightweight pipe such as an aluminum pipe as a support for the small diameter water conduit provides a very convenient, effective and economical support while at the same time protecting the synthetic resin pipe from possible damage. While other support arrangements may be employed, it is important that the water conduit, per se, be of relatively small diameter to reduce to a minimum the weight of water supported in cantilevered fashion forward and rearward from the boom. The concentric conduit and support pipe arrangement has the advantage of avoiding the necessity of securing the conduit and support together along the length of the conduit.

While I have disclosed and described a preferred embodiment of my invention, I wish it understood that I do not intend to be restricted solely thereto, but rather that I do intend to include all embodiments thereof which would be apparent to one skilled in the art and which come within the scope and spirit of my invention.

I claim:

1. In a land irrigation system including an elongated structural boom supporting a water distribution pipe above the land to be irrigated, driven means supporting the boom and water distribution pipe for movement over the land to be irrigated, and connector means for connecting the water distribution pipe to a source of water under pressure to be discharged from the water distribution pipe through spray heads during movement of the water distribution pipe over the land, the improvement comprising a plurality of elongated generally horizontal conduits, coupling means connecting each of the elongated conduits to the water distribution pipe at spaced intervals along the water distribution pipe and providing a water flow path between the water distribution pipe and each of the elongated conduits, a plurality of spray heads connected to each elongated conduit along its length and in spaced relation to one another, said spray heads each being adapted to discharge water in a spray pattern to distribute the water over an area of ground having a substantial dimension in a direction parallel to the water distribution pipe, means mounting the elongated conduits on the structural boom in spaced, generally parallel relation to one another with each elongated conduit being disposed at an acute angle relative to the longitudinal axis of the water distribution pipe, the elongated conduits having their end portions projecting outwardly from the structural boom on each side thereof whereby, upon movement of the water distribution pipe over the land to be irrigated, the spray heads connected to each elongated conduit travel paths above the ground which are offset relative to one another along the longitudinal axis of the water distribution pipe, the spacing of the elongated conduits and their angle relative to the water distribution pipe being such that the area of ground covered by the spray pattern from each spray head overlaps a portion of the areas covered by at least one spray head on an adjacent elongated conduit and at least one spray head on the same elongated conduit.

2. The land irrigation apparatus according to claim 1 comprising at least four spray heads connected to each elongated conduit, with at least two spray heads being located on each side of the water distribution pipe.

3. The land irrigation apparatus according to claim 2 comprising five spray heads connected to each elongated conduit with one of the spray heads being disposed in generally vertical alignment with the water distribution pipe.

4. The land irrigation apparatus according to claim 1 further comprising filter means connected between the water distribution pipe and the spray heads connected to each elongated conduit.

5. The land irrigation apparatus according to claim 1 wherein the means mounting the elongated conduits comprises elongated support means mounted on the structural boom and extending outwardly therefrom, the elongated support means supporting at least a major portion of the length of the elongated conduits.

6. The land irrigation apparatus according to claim 5 wherein said elongated conduit comprises a length of plastic pipe, the plastic pipe being of such size and strength as to be incapable of reliably supporting its outwardly projecting end portions when filled with water.

7. The land irrigation apparatus according to claim 6 wherein the elongated support means comprises an elongated metal pipe having a diameter substantially greater than the diameter of the plastic pipe, the plastic pipe being supported within the metal pipe.

8. The land irrigation apparatus according to claim 1 wherein the elongated conduits are disposed at an angle of about 22° relative to a line perpendicular to the vertical centerplane of the water distribution pipe.

9. The land irrigation apparatus according to claim 8 wherein the spray pattern discharged from said spray heads is generally circular and wherein the spacing of the elongated conduits along the water distribution pipe is substantially equal to the diameter of the circular water spray pattern discharged from the spray heads.

10. The land irrigation apparatus according to claim 1 comprising at least four spray heads connected to each elongated conduit, with at least two spray heads being located on each side of the water distribution pipe, and filter means connected between the water distribution pipe and the spray heads connected to each elongated conduit.

11. The land irrigation apparatus according to claim 10 wherein the means mounting the elongated conduits comprises elongated support means mounted on the structural boom and extending outwardly therefrom, the elongated support means supporting at least a major portion of the length of the elongated conduits.

12. The land irrigation apparatus according to claim 11 wherein said elongated conduit comprises a length of plastic pipe, the plastic pipe being of such size and strength as to be incapable of reliably supporting its outwardly projecting end portions when filled with water.

13. The land irrigation apparatus according to claim 12 wherein the elongated support means comprises an elongated metal pipe having a diameter substantially greater than the diameter of the plastic pipe, the plastic pipe being supported within the metal pipe.

14. The land irrigation apparatus according to claim 13 wherein the spray pattern discharged from said spray heads is generally circular and wherein the spacing of the elongated conduits along the water distribution pipe is substantially equal to the diameter of the circular water spray pattern discharged from the spray heads.

15. The land irrigation apparatus according to claim 14 wherein the elongated conduits are disposed at an angle of about 22° relative to a line perpendicular to the vertical centerplane of the water distribution pipe.

16. The land irrigation apparatus according to claim 15 comprising five spray heads connected to each elongated conduit with one of the spray heads being disposed in generally vertical alignment with the water distribution pipe.

17. The land irrigation apparatus according to claim 1 wherein the spacing of elongated conduits along said water distribution pipe is no greater than about equal to the dimension of said spray pattern measured parallel to the water distribution pipe.

18. The land irrigation apparatus according to claim 17 wherein the area irrigated by each spray head as the apparatus moves over the land to be irrigated overlaps at least a portion of the area irrigated by a plurality of spray heads connected to the same elongated conduit and at least a portion of the area irrigated by a plurality of spray heads connected to an adjacent elongated conduit.

* * * * *